(12) United States Patent
Harrer et al.

(10) Patent No.: US 7,282,830 B2
(45) Date of Patent: Oct. 16, 2007

(54) STATOR FOR AN ELECTRICAL MACHINE (75) Inventors: Wolfgang Harrer, Gerlingen (DE); Eberhard Rau, Korntal-Muenchingen (DE); Thomas Berger, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/494,400

(22) PCT Filed: Sep. 22, 2003

(86) PCT No.: PCT/DE03/03136

§ 371 (c)(1),
(2), (4) Date: May 3, 2004

(87) PCT Pub. No.: WO2004/032307

PCT Pub. Date: Apr. 15, 2004

(65) Prior Publication Data

US 2005/0067911 A1    Mar. 31, 2005

(30) Foreign Application Priority Data

Sep. 30, 2002    (DE)    ............... 102 45 691

(51) Int. Cl.
H02K 1/12    (2006.01)

(52) U.S. Cl. .................. 310/216; 310/217; 310/254; 310/259

(58) Field of Classification Search ................ 310/254, 310/216–217
See application file for complete search history.

(56) References Cited

U.S. PATENT DOCUMENTS

| | | | | |
|---|---|---|---|---|
| 6,009,607 A | | 1/2000 | Bertocchi et al. | |
| 6,072,259 A | * | 6/2000 | Kawabata et al. | 310/216 |
| 6,177,748 B1 | * | 1/2001 | Katcher et al. | 310/209 |
| 6,337,529 B1 | * | 1/2002 | Higashino et al. | 310/254 |
| 6,559,572 B2 | * | 5/2003 | Nakamura | 310/254 |
| 6,566,781 B2 | * | 5/2003 | Oohashi et al. | 310/216 |
| 6,729,011 B2 | * | 5/2004 | Asao et al. | 29/596 |
| 6,744,171 B1 | * | 6/2004 | Kolomeitsev | 310/254 |
| 2001/0017500 A1 | * | 8/2001 | Hirama et al. | 310/217 |

FOREIGN PATENT DOCUMENTS

| | | | |
|---|---|---|---|
| DE | 10102658 A | * | 7/2001 |
| FR | 2806851 A | * | 9/2001 |
| GB | 977749 | * | 12/1964 |
| GB | 2260862 A | * | 4/1993 |
| GB | 2 314 692 A | | 1/1998 |
| WO | WO01/54254 A1 | * | 7/2001 |

* cited by examiner

Primary Examiner—Burton Mullins
(74) Attorney, Agent, or Firm—Michael J. Striker (57) ABSTRACT A stator for an electrical machine is proposed that has a stator winding (45) that is held by a stator core (10) that is formed into an annular shape. The stator core (10) has grooves (14) and teeth (13) on its radially inwardly oriented circumference. The stator core (10) is composed of layered stator sheet metal lamellae (11), the direction of the layers defining an axial direction (a). It is provided that at least a first stator sheet metal lamella (20) has a higher flexural strength than second stator sheet metal lamellae (21), the at least one first stator sheet metal lamella (20) having a thickness ($d_{LE}$) in the axial direction (a) that does not exceed 4 mm.

3 Claims, 7 Drawing Sheets

STATOR FOR AN ELECTRICAL MACHINE

BACKGROUND INFORMATION

An electrical machine has been known in the related art for a long time, the stator of which is manufactured using the "strip packet technique". To manufacture said stator, individual sheet metal lamellae are first stamped out, then a certain number of said sheet metal lamellae is stacked, one on top of the other, until the desired axial width of the core is obtained. Said layered sheet metal lamellae form the stator core, which therefore has parallel teeth and grooves that are common for a stator. A prewound core winding is available in approximately flat form and is inserted in the grooves of the essentially flat core. The assembly composed of core and core winding is then bent into a round shape, resulting in a common hollow-cylindrical stator. After the assembly composed of stator core and winding is bent into a round shape, the two ends are joined.

To facilitate bending, it is desirable to attach an end lamella on at least one end face of the stator core, which has a higher rigidity than other lamellae referred to as "main lamellae". The stator is prevented from being spread in the area of the stator teeth.

For reasons of energy, production engineering and handling, it is not possible to use just any stator sheet metal lamella that is more rigid. The consequences of a more rigid end lamella are also highly dependent on the sizing of the electrical machine.

ADVANTAGES OF THE INVENTION

The stator, according to the invention, having the features of the main claim has the advantage that, with the stated thickness for a first stator sheet metal lamella, a selection is made with which the energy losses are at a level that is still electromagnetically reasonable. If the stator sheet metal lamellae have a thickness that does not exceed 4 mm, the eddy currents that occur within a lamella at high stator winding currents are acceptable. If the stator sheet metal lamella were thicker than 4 mm, the eddy currents within this one lamella would become so great that the efficiency of the entire electrical machine would drop. In addition, the eddy currents induced in the first stator sheet metal lamella would produce a great deal of waste heat energy, which would result in an asymmetrical radial expansion of the stator core. As a result of this, the stator housing that is close to the at least one thick stator sheet metal lamella would be stressed not only axially by stator restraining forces, but an additional radial force would also act on the stator housing via the radial expansion of the stator core at this point. This would produce a complex and, in sum, higher state of stress that would result in, among other things, a rupture in the part of the housing that extended over the stator core.

Advantageous further developments of the stator according to the main claim are possible due to the measures listed in the subclaims.

The first stator sheet metal lamella, which is thicker than the second stator sheet metal lamella, should also have a minimum thickness of 0.8 mm. As desired, this minimal thickness largely prevents the stator core, which is eventually bent into a round shape, from fanning on its radially inward side (teeth). A particularly favorable thickness of the first stator sheet metal lamella is given when the thickness in the axial direction of the stator core is between 1.0 and 2.0 mm.

In order to prevent fanning of the radially inwardly oriented teeth to a sufficient extent, it is provided that the thickness of the second stator sheet metal lamella is between 0.3 mm and 0.7 mm.

A further influencing variable on the fanning of the radially inwardly oriented teeth is the "yoke height" of the stator core. The greater the yoke height, the greater is the fanning of the teeth. In addition, as the yoke height increases, so does the complexity and energy expenditure required to bend the stator core into a round shape, because the flexural strength increases as the yoke height increases. On the other hand, the magnetic flux through the yoke of the stator core should not have resistance that is too great, so that, overall, a yoke height of between 3 mm and 7 mm is provided.

The most favorable dimensional range for the yoke height is between 3.5 mm and 4.3 mm. In a further embodiment it is provided for the first stator sheet metal lamella that it is configured as an axial end lamella. In this position, it is possible for this first stator sheet metal lamella to counteract all of the other stator sheet metal lamella in terms of fanning.

According to a further embodiment, it is provided that the first stator sheet metal lamella that is configured and/or positioned as an end lamella has a different lamella contour that deviates from the contour of the second stator sheet metal lamella.

In a further exemplary embodiment, it is provided that at least one first stator sheet metal lamella is a lamella between two end lamellae. The advantage of this is that a symmetrical stiffening of the stator core is achieved with just one individual first stator sheet metal lamella.

In a variation it is provided that at least one end lamella is a first stator sheet metal lamella. This also includes the variation, for example, according to which the end lamella and also a subsequent stator sheet metal lamella is a first stator sheet metal lamella. As a result of this, the rigidity of the stator core is increased further, and, as the rigidity increases, the complexity of manufacturing the end lamellae is reduced. If a stator sheet metal lamella is compared with two stator sheet metal lamellae that ultimately have the same thickness as the one stator sheet metal lamella, the fabrication cost for the thinner stator sheet metal lamellae is lower. The cut edges for relatively thick stator sheet metal lamellae are qualitatively poor compared to the two thin stator sheet metal lamellae.

If the stator core is configured in such a manner that, for example, one first stator sheet metal lamella each is located in an axial center and at each axial end, then the stator core can be formed out of two identical stator core halves. This would be easier to automate than an embodiment with one individual first stator sheet metal lamella in the center of the stator core.

It is further provided that an electrical machine, in particular an alternator for a motor vehicle, is designed with a stator according to one of the preceding exemplary embodiments.

DRAWING

Exemplary embodiments of a stator, according to the invention, for an electrical machine is depicted in the drawing.

FIG. 9b shows the interaction of a housing part with a stator core in accordance with the exemplary embodiments in FIG. 5a, FIG. 5b and FIG. 7b through FIG. 9a.

DETAILED DESCRIPTION OF THE EMBODIMENTS

Figure 1A:
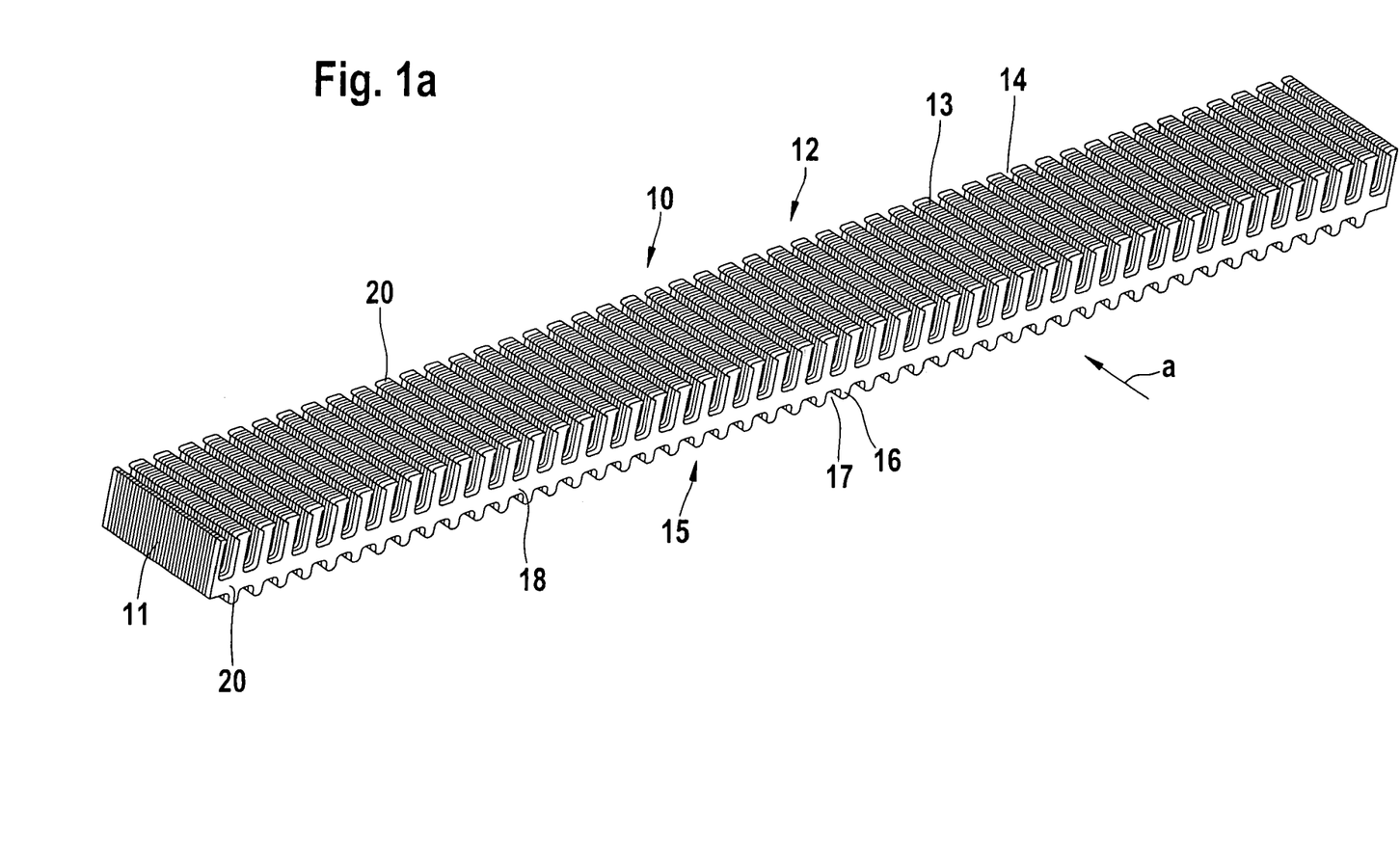
FIG. 1a shows a laminated stator core according to a first exemplary embodiment.

FIG. 1a depicts a stator core 10 composed of layered stator sheet metal lamellas 11. Stator sheet metal lamellas 11 are arranged in such a manner that teeth 13 and grooves 14 extend on one side 12. Said teeth 13 eventually serve the purpose in a stator of capturing the electromagnetic field emitted from a rotor and thereby inducing an electric voltage in a stator winding that is located in grooves 14. After an assembly composed of stator core 10 and stator winding is bent into a round shape, said side 12 is oriented radially inwardly. Stator core 10 also has a back side 15, which is later oriented radially outwardly. Back side 15 is also profiled and carries back teeth 16, between which back grooves 17 extend. Teeth 13 and back teeth 16 are joined as a single component via a yoke 18. The layered stator sheet metal lamellas 11 define a direction of the layers, which agrees with an axial direction a. The axial direction later corresponds to an axis of rotation of the rotor in the electrical machine. Stator core 10 is composed of layers having at least two different stator sheet metal lamellas 11. In FIG. 1, one first stator sheet metal lamella 20 is located on each particular end face of stator core 10. Second stator sheet metal lamellas 21 are located between said two first stator sheet metal lamellas 20. The first stator sheet metal lamellas 20 have a higher flexural strength than the second stator sheet metal lamellas 21.

Figure 1B:
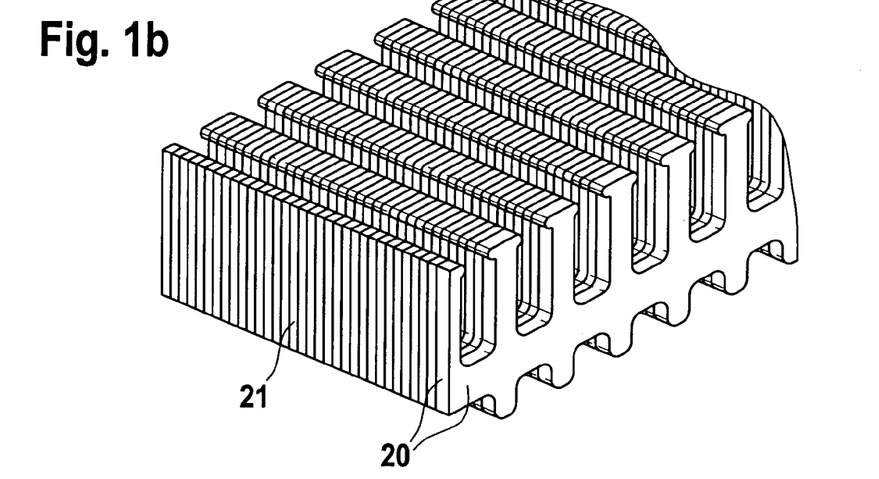
FIG. 1b shows an enlarged detained view of the first exemplary embodiment.

As an alternative, a stator core 10 is also provided that is composed of second stator sheet metal lamellas 21 and has at least one first stator sheet metal lamella 20 on an end face. A variation of this nature is shown in FIG. 1b, with a first stator sheet metal lamella 20 on only one end face.

Figure 2A:
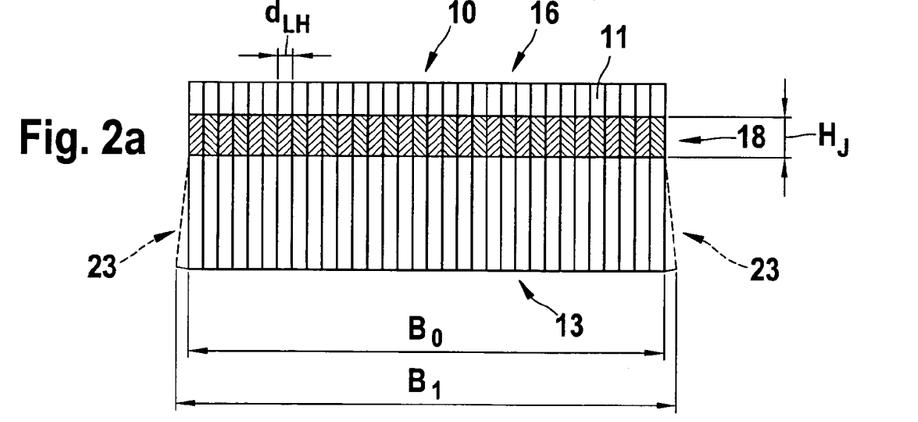
FIG. 2a shows a cross section through a stator core, whereby all lamella have the same thickness.

FIG. 2a shows a cross section through a stator core 10 through yoke 18 at the position of a groove 14. Said stator core 10 is composed of stator sheet metal lamellas 11 that correspond to a second stator sheet metal lamella 21 in terms of thickness $d_{LH}$, e.g., having a material thickness of 0.5 mm. Yoke 18 has a yoke height $H_J$, e.g., 4 mm. If a stator core of this nature with a stator winding inserted in grooves 13 is bent into a round shape, the strong curvature of yoke 18 causes the stator sheet metal lamellas 11 to fan; said fanning starts at the neutral fiber in the yoke and becomes particularly noticeable in the end region of teeth 13. Said fanning 23 is indicated here as expansion $\delta_B$, whereby expansion $\delta_B$ is a function of the original width $B_0$ of stator core 10 and the final width, $B_1$, of stator core 10 after bending. The relationship is expressed as a formula as follows:

$$\delta_B = (B_1/B_0) - 1$$

Figure 2B:
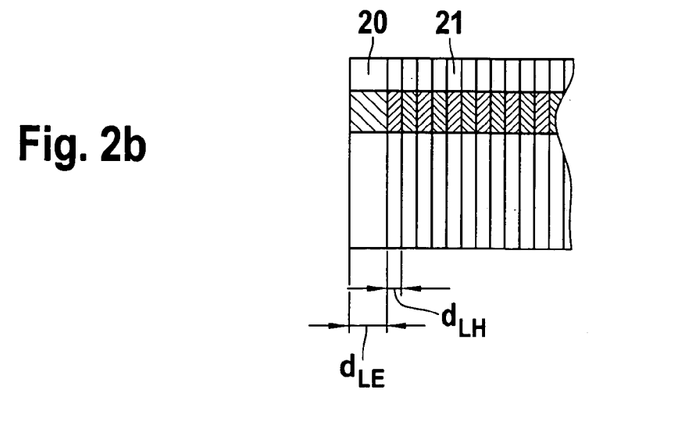
FIG. 2b shows a detained view of a stator core with a thicker end lamella.
Figure 3:
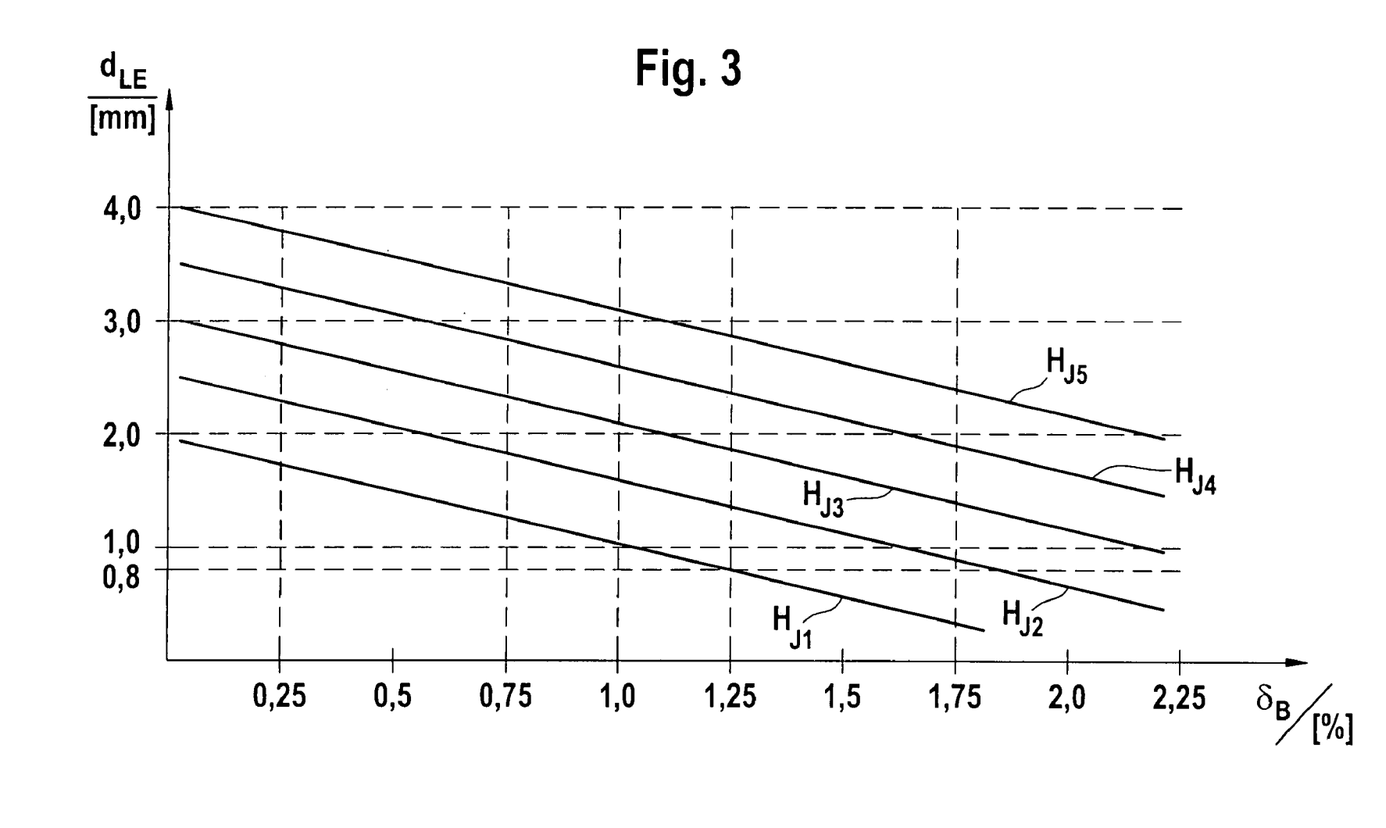
FIG. 3 shows a diagram that shows the correlation between axial rotation, yoke height and the thickness of a first stator sheet metal lamella.

As shown in FIG. 3, expansion $\delta_B$ is a function of, among other things, yoke height $H_J$ and thickness $d_{LE}$ of a first stator sheet metal lamella 20 that is used. A further influencing variable is the material thickness $d_{LH}$ of the second stator sheet metal lamellas 21 that are used. The dimensions are shown in FIG. 2b.

FIG. 3 shows, in a diagram, the effect of a first stator sheet metal lamella 20 having a certain material thickness $d_{LE}$ on the expansion $\delta_B$ that is achieved, as a function of various yoke heights $H_J$. The relationships were determined as a function of second stator sheet metal lamellas 21 having a material thickness of 0.5 mm. Various embodiments were measured, and yoke height $H_J$ was varied. Yoke heights are $H_J=3$ mm, $H_J=4$ mm, $H_J=5$ mm, $H_J=6$ mm, and $H_J=7$ mm. It is clear to see that, given a constant yoke height and a constant material thickness of a second stator sheet metal lamella 21, the influence of a first stator sheet metal lamella 20 on expansion $\delta_B$ increases in such a manner that, as the material thickness of the first stator sheet metal lamella 20 increases, expansion $\delta_B$ can be reduced markedly. Due to the results obtained from this exemplary diagram in FIG. 3 and other calculations for different material thicknesses $d_{LH}$ for second sheet metal lamella 21, the first stator sheet metal lamellas 20 should have a thickness of $d_{LE}$ in the axial direction that does not exceed 4 mm. It is further provided that the at least one first stator sheet metal lamella 20 has a thickness $d_{LE}$ in the axial direction, that is at least 0.8 mm. It is further preferred that the at least one first stator sheet metal lamella 20 has a thickness $d_{LE}$ in the axial direction, that is between 1.0 and 2.0 mm, inclusive. When the expenditure for the manufacture of a first stator sheet metal lamella 20 of this nature is reasonable, therefore, very good results are obtained for the limitation of expansion $\delta_B$. Additional calculations showed that the use of thicker first stator sheet metal lamellas 20 is particularly effective when the second first stator sheet metal lamellas 21 have a thickness $d_{LH}$ between 0.3 mm and 0.7 mm. In the first approximation, values are preferred for yoke height $H_J$ that are between 3 and 7 mm, inclusive. In a second approximation it was shown that the stator core 10 should have a yoke height $H_J$ that is between 3.5 mm and 4.3 mm.

Figure 4:
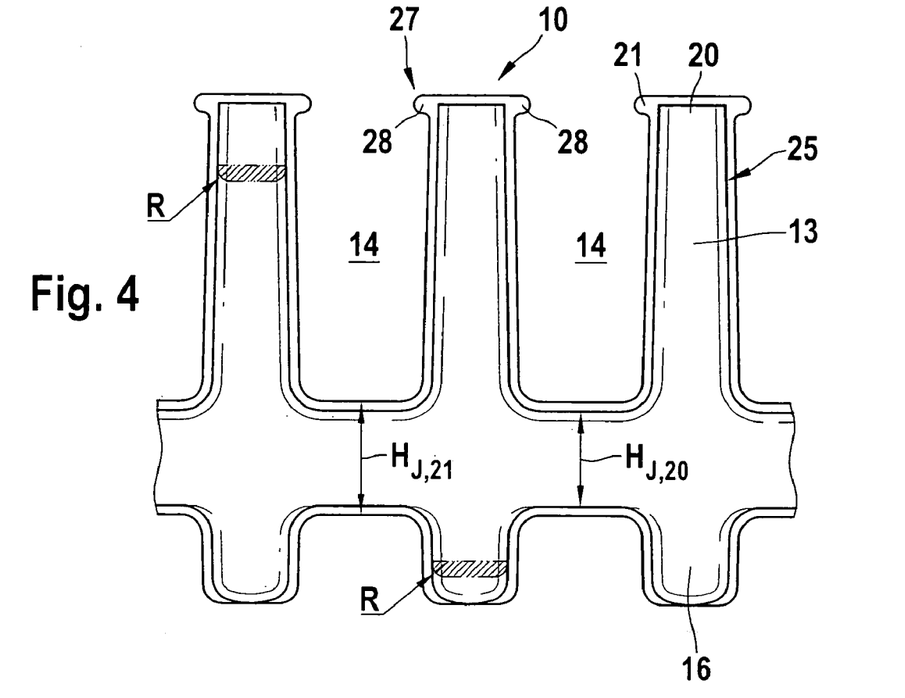
FIG. 4 shows a side view of a stator core with an end lamella having a modified configuration.

FIG. 4 shows a side view of a section of stator core 10. This further exemplary embodiment shows second stator sheet metal lamellas 21, which are covered by at least one first stator sheet metal lamella 20 on an axial end of the stator core 10. Said first stator sheet metal lamella 20 has a different contour 25 than the second stator sheet metal lamellas 21. Here, for example, teeth 13 are narrower than teeth 13 of the second stator sheet metal lamellas 21. Teeth 13 of second stator sheet metal lamellas 21 have a pronounced crown 27, for example, that has strips 28 that extend over each adjacent groove 14. First stator sheet metal lamella 20 does not have strips of this nature. In addition, the extent of yoke height $H_{j,\,20}$ of first stator sheet metal lamellas 20 can be smaller than yoke height $H_{j,\,21}$ of second stator sheet metal lamellas 21. If one looks at a cross section through a tooth 13 of first stator sheet metal lamella 20, one can see the edges of teeth 13 that are rounded (R) toward grooves 14. The rounding of the edges can have taken place during punching, for example, via "punched retraction". Likewise, a corresponding rounding of the edges can have been carried out on the back teeth 16.

Figure 5A:
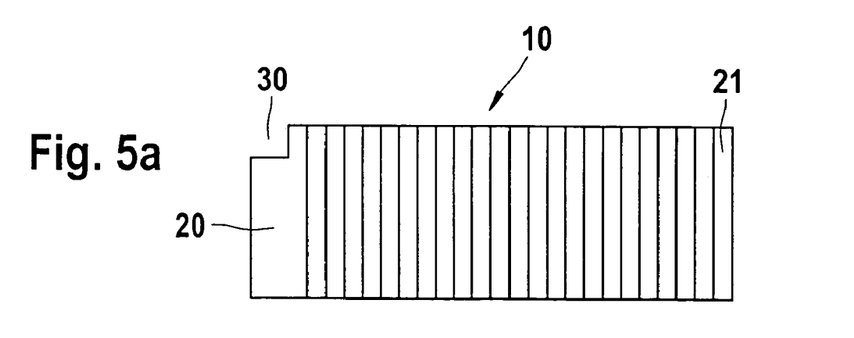
FIGS. 5a, 5b and 6 show various cross sections through a stator core according to further exemplary embodiments.
Figure 5B:
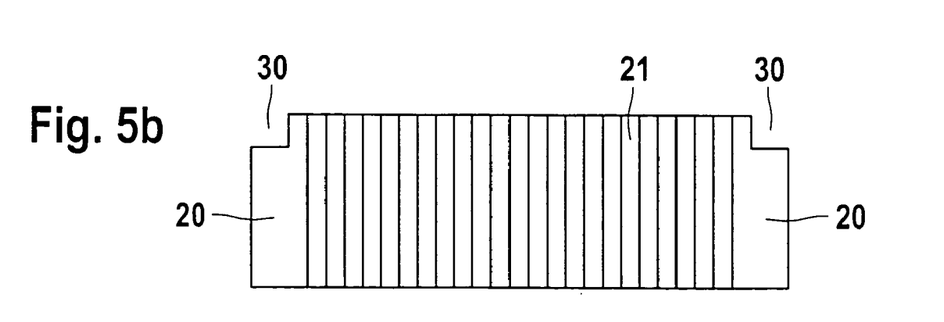

FIG. 5a shows a further variant of a stator core 10. In addition to two stator sheet metal lamellas 21, stator core 10 has at least a first stator sheet metal lamella 20 that is thicker than the second stator sheet metal lamellas 21. First stator sheet metal lamella 20 has a shoulder 30 on its outer circumference that extends all the way around. Said shoulder 30 serves as a seat in a housing of the electrical machine. It is achieved by obtaining a certain axial length between the right end face of stator core 10 and the end face of shoulder 30 that is significant for the quality of the clamping effect between two housing halves. Said shoulder 30 is formed by turning on a lathe, for example. The exemplary embodiment according to FIG. 5b shows a first stator sheet metal lamella 20 on each of the two axial end faces of stator core 10, which accommodate second stator sheet metal lamellas 21 between them. In the picture, a shoulder 30 is formed in each of the first stator sheet metal lamella 20. If it is not required, one shoulder 30 can be eliminated, for example.

Figure 6:
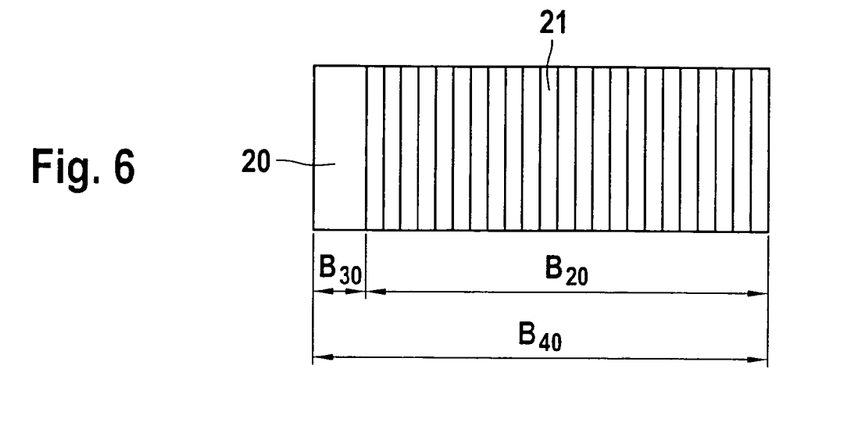

FIG. 6 shows a front view of a further variant of a stator core 10. A width $B_{20}$ is measured starting from a first stack that is formed out of second stator sheet metal lamellas 21, which said first stack does not initially contain a first stator sheet metal lamella 20. A selected first stator sheet metal lamella 20 is stacked on top of this first stack having width $B_{20}$ within a certain tolerance. Said first stator sheet metal lamella 20 has a width $B_{30}$, which has an ideal width $B_{30}$ in accordance with width $B_{20}$, so that the desired width $B_{40}$ of the entire stack results. Width $B_{40}$ also has a tolerance. If the stack composed of second stator sheet metal lamellas 21 has a width that is different from $B_{20}$, however, e.g., a width that is smaller than width $B_{20}$, a first stator sheet metal lamella 20—to be placed on the stack—having a width $B_3$ is selected, which is greater than width $B_{30}$. The same is true in the reverse case, namely, when the stack composed of second stator sheet metal lamellas 21 has a larger width than width $B_{20}$. In this case, a first stator sheet metal lamella 20 is selected that has a width $B_3$ that is smaller than $B_{30}$. The goal of this measure is to obtain a complete stack composed of second stator sheet metal lamellas 21 and at least one first stator sheet metal lamella 20 that has a target width $B_{40}$ with a technically permissible tolerance position. This makes it possible to manufacture a stator core and/or stator laminated stack with which a high trueness to size can be achieved even in an early stage of manufacture; further mechanical processing, such as turning on a lathe, i.e., removing material from the stator core on the necessary axial length, becomes superfluous.

Figure 7A:
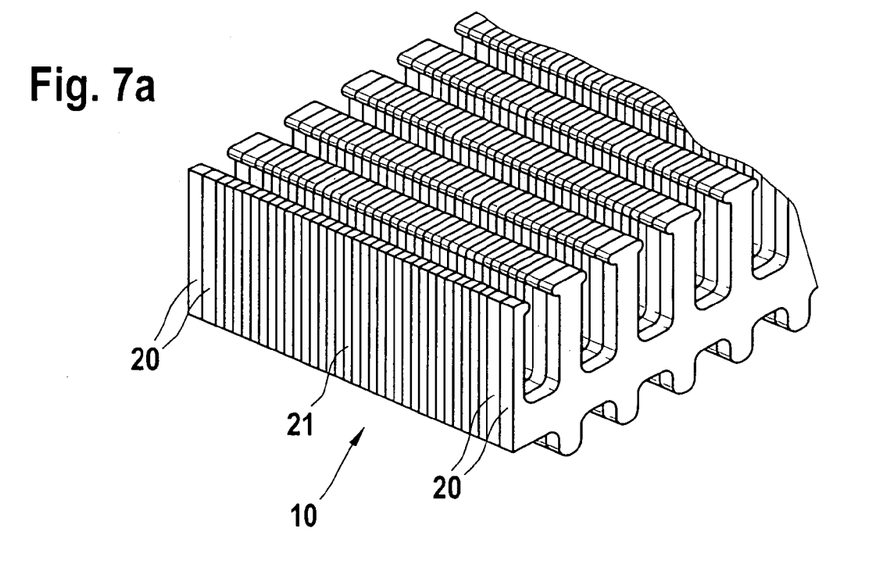
FIGS. 7a, 7b, 8 and 9a show further exemplary embodiments of a stator core.

FIG. 7a shows a section of a further exemplary embodiment of a stator core 10. This exemplary embodiment carries two first stator sheet metal lamellas 20 on each of its axial ends, which said first stator sheet metal lamella accommodate second stator sheet metal lamellas 21 between them.

Figure 7B:
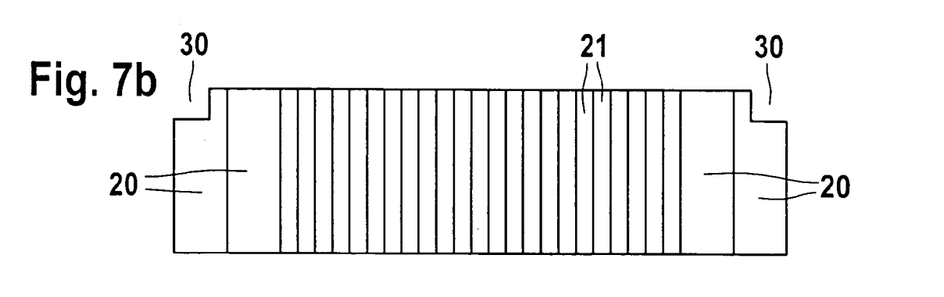

FIG. 7b shows this arrangement in a front view, whereby a shoulder 30 has additionally been formed in each of the outermost first stator sheet metal lamellas 20.

Figure 8:
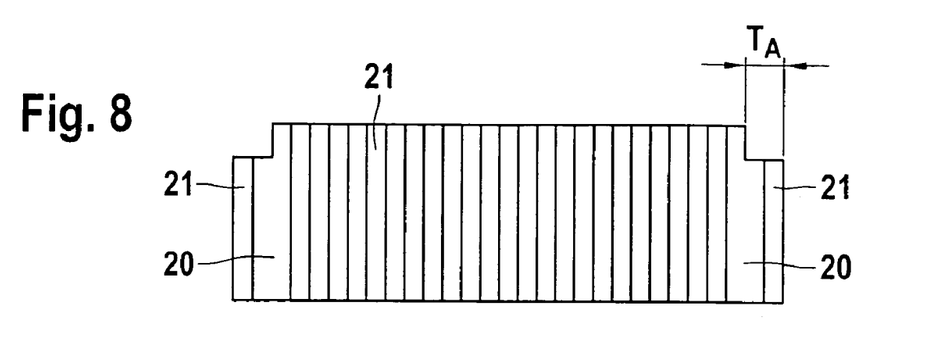

FIG. 8 is a further exemplary embodiment of a stator core 10. In this case, first stator sheet metal lamellas 20 accommodate a certain number of second stator sheet metal lamellas 21 between them. In addition, the first stator sheet metal lamellas 20 are covered on each of their axial outer sides by a second stator sheet metal lamella 21 that forms an end lamella. An arrangement of this type is desirable, for example, when the axial depth $T_A$ of shoulder 30 has reached a level that would end between two adjoining second stator sheet metal lamellas 21, for example. In certain circumstances, this would result in extremely thin sheet metal thicknesses in the area of shoulder 30, which would be prevented by such an arrangement of the first stator sheet metal lamellas 20, because the axial end face would always end this way in the material of a lamella. As an alternative, it can also be provided that the end lamella is a first stator sheet metal lamella 20 having a different thickness $d_{LE}$.

Figure 9A:
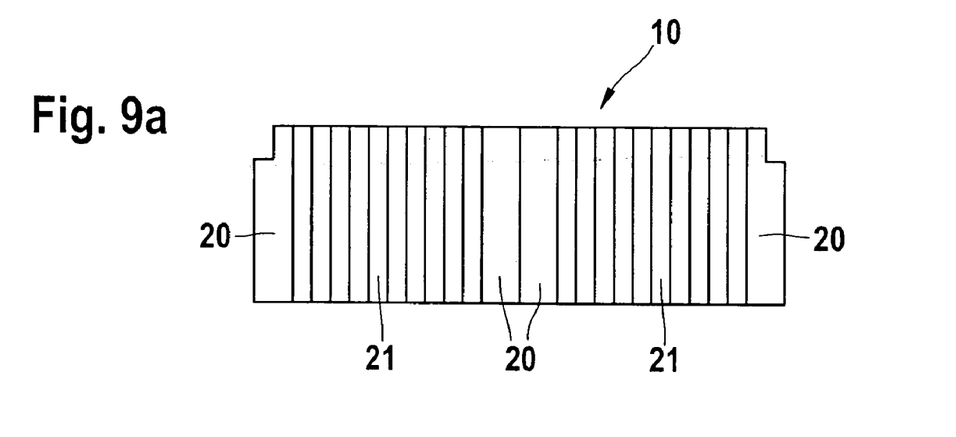

In a further exemplary embodiment according to FIG. 9a, each of the first stator sheet metal lamellas 20 accommodates second stator sheet metal lamellas 21 between them, and two first stator sheet metal lamellas 20 are located in an axial center of stator core 10 to increase the rigidity of stator core 10. As an alternative, only one center first stator sheet metal lamella 20 can be provided.

Figure 9B:
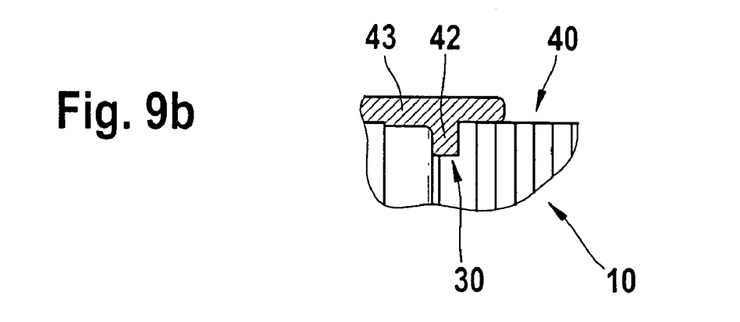

FIG. 9b is a sectional view of the transition point between a stator core 10 and a stator 40, that is, a stator core 10 that has already been bent into a round shape, with the stator winding that was inserted before the bending into a round shape. It is clear to see how shoulder 30 engages in a shoulder 42 on housing 43.

Figure 10:
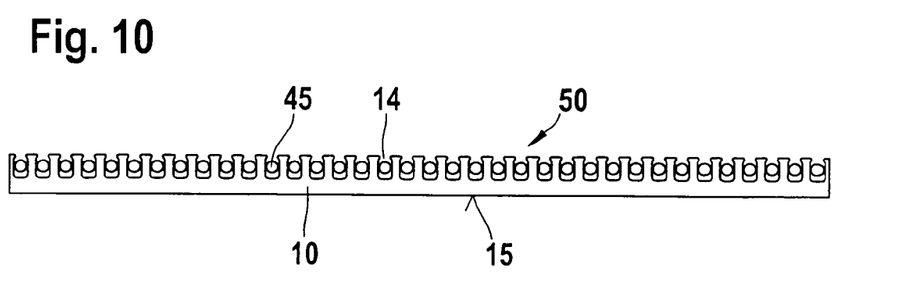
FIG. 10 shows a stator core in accordance with one of the exemplary embodiments of layered stator sheet metal lamellae with a stator winding.
Figure 11:
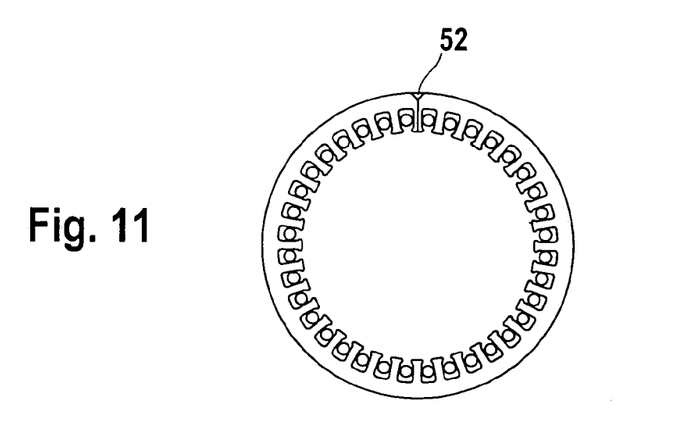
FIG. 11 shows a stator for an electrical machine that is produced by bending the exemplary embodiment shown in FIG. 10 into a round shape.

Very generally, it is provided that a stator core 10 according to one of the exemplary embodiments described hereinabove is provided with a stator winding 45. In FIG. 10, stator winding 45 is depicted symbolically in the form of coil sides. Said stator winding preferably has a three-phase winding and is inserted via its coil sides into grooves 14 of stator core 10. As shown in FIG. 10, this can take place with a flat stator core 10, for example, but it can also take place with a non-flat stator core 10, e.g., one that is drawn across back side 15 in such a manner that grooves 14 open. A drawn position of stator core 10 is not required to insert stator winding 45 in it. Assembly 50 shown in FIG. 10 that is composed of stator core 10 and stator winding 45 is then bent round in such a manner that grooves 14 point toward a common center, FIG. 11. Assembly 50, in the bent state, is then joined at its two adjoining end faces of stator core 10. This can take place via welding at this point, so that a weld seam 52 is produced there.

Figure 12:
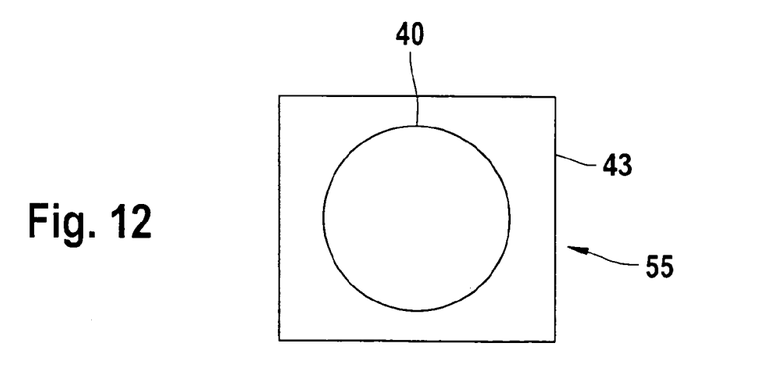
FIG. 12 is a symbolic depiction of an electrical machine with a stator according to the invention.

FIG. 12 is a symbolic representation of an electric machine 55 that has a housing and a stator 40.

Within the framework of this invention, a stator 40 for an electrical machine 55 is provided, whereby said stator 40 has a stator winding 45 that is held in a stator core that is formed into an annular shape. Stator core 10 has grooves 14 and teeth 13 on its radially inwardly oriented circumference. It is composed of layered stator sheet metal lamellas 11, the direction of the layers of which defines an axial direction a. At least a first stator sheet metal lamella 20 has a higher flexural strength than second stator sheet metal lamellas 21. It is provided that at least a first stator sheet metal lamella 20 has a thickness $d_{LE}$ in axial direction a, which does not exceed 4 mm. It is further provided that the at least one first stator sheet metal lamella 20 has a thickness $d_{LE}$ in the axial direction, which is at least 0.8 mm. It has proven advantageous that the at least one first stator sheet metal lamella 20 has a thickness $d_{LE}$ in axial direction a, which is between 1.0 and 2.0 mm, inclusive. It has furthermore proven favorable that the thickness $d_{LE}$ of the second stator sheet metal lamellas 21 is between 0.3 and 0.7 mm, inclusive. Moreover, a yoke height $H_J$ is preferred that is between 3 mm and 7 mm. Compared to this first approximation, it has proven particularly advantageous that stator core 10 has a yoke height $H_J$, which is between 3.5 mm and 4.3 mm. In a preferred embodiment, it is provided that the at least one first stator sheet metal lamella 20 is an end lamella, and, as a result, is located on an axial end of a stator core 10. To protect stator winding 45, it is provided that the at least one end lamella has a different lamella contour than the second stator sheet metal lamellas 21. This applies, for example, when the end lamella is configured as first stator sheet metal lamella 20. This is not limited, however, and can also be applied to second stator sheet metal lamellas 21, for example. If at least one first stator sheet metal lamella 20 is placed inside stator core 10, a position in the axial center of stator core 10 is preferred.

In addition, it is provided in a further first approximation that only takes into account the eddy current losses that the axial width and/or the material thickness of the at least one first stator sheet metal lamella 20 does not exceed the axial width of stator core 10 by more than 10%. If stator core 10 is 40 mm wide axially, the material thickness of the at least one first stator sheet metal lamella 20 should not be wider than 4 mm. In a second approximation, a maximum width of the at least one first stator sheet metal lamella 20 of 5% is provided, so that the material thickness of the at least one first stator sheet metal lamella 20 should not be wider than 2 mm.

What is claimed is:

1. A stator for an electrical machine, with a stator winding (45) that is held by a stator core (10) having first the form of a strip that is then formed into an annular shape, which has grooves (14) and teeth (13) on its radially inwardly oriented circumference, whereby the stator core (10) has a plurality of stacked stator sheet metal lamellae (11) in the form of strips, the direction of the layers defining an axial direction (a), whereby at least a first stator strip-shaped sheet metal lamella (20) has a higher flexural strength than second strip-shaped stator sheet metal lamellae (21), whereby the at least one first stator sheet metal lamella (20) has a thickness ($d_{LE}$) in the axial direction (a) that does not exceed 4 mm, wherein the at least one first stator sheet metal lamella (20) is located between two end lamellae.

2. The stator as recited in claim 1, wherein at least one end lamella is a first stator sheet metal lamella (20).

3. The stator as recited in claim 1, wherein the at least one first stator sheet metal lamella (20) is located in an axial center of the stator (45).

* * * * *